UNITED STATES PATENT OFFICE.

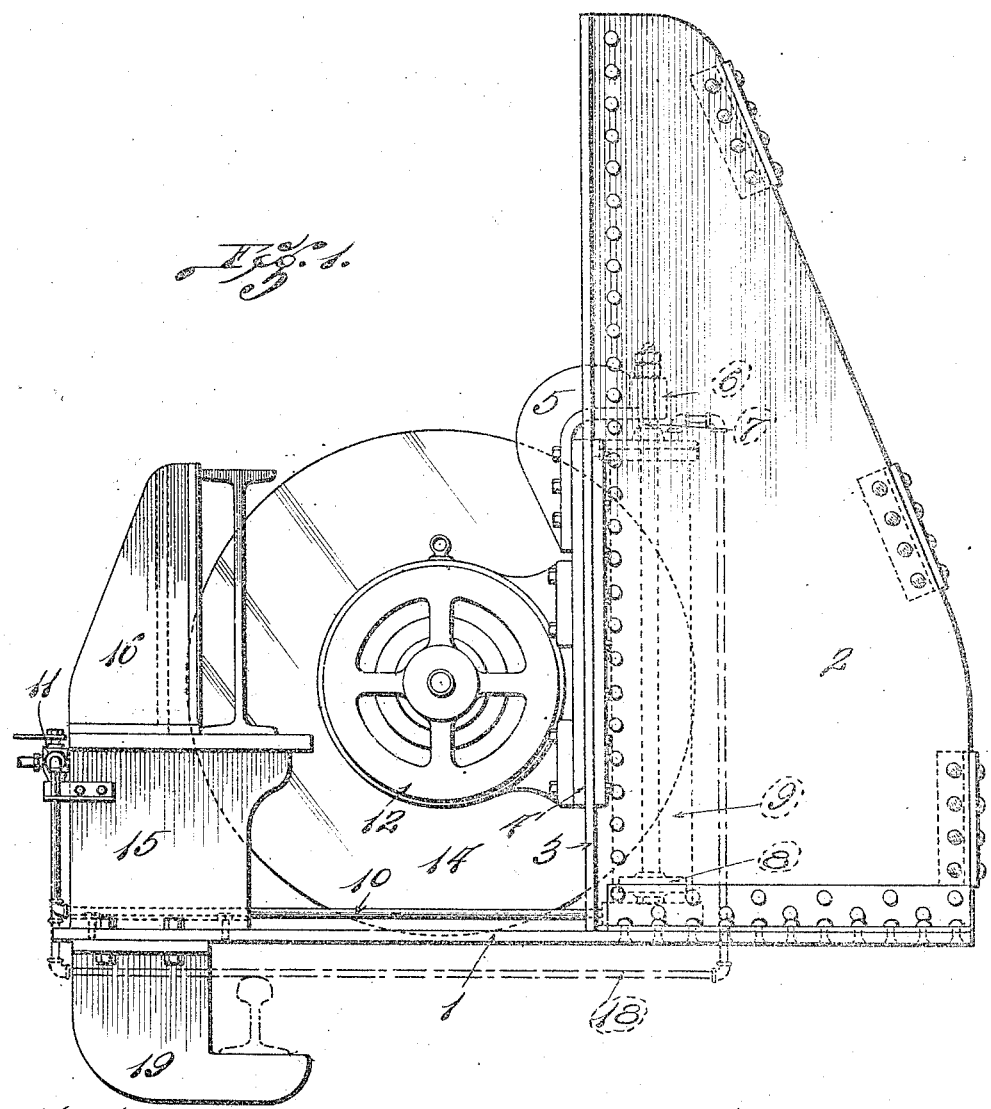

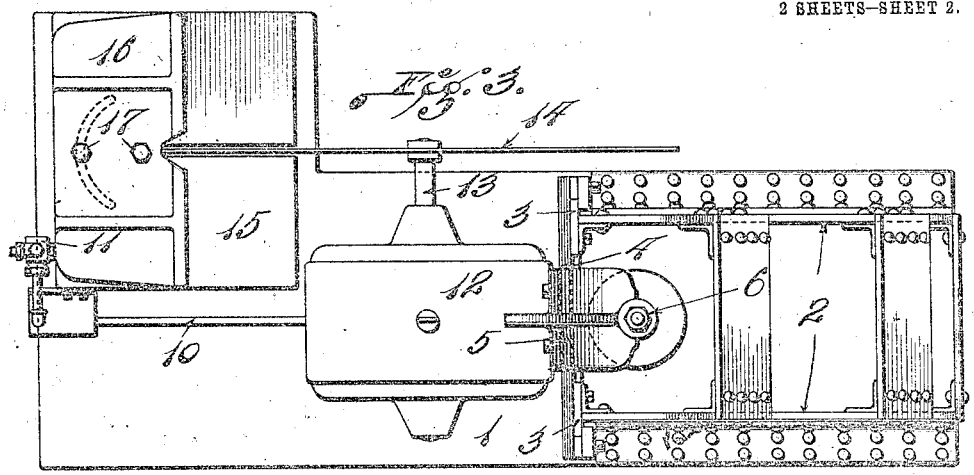
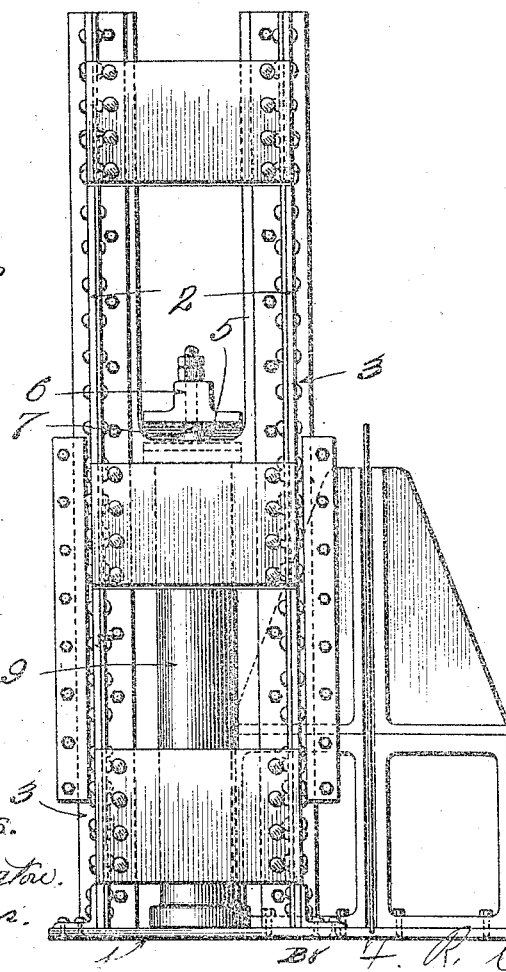

HENRY A. FERGUSSON, OF ST. LOUIS, MISSOURI; ELLA M. FERGUSSON, OF WEBSTER GROVES, MISSOURI, EXECUTRIX OF SAID HENRY A. FERGUSSON, DECEASED.

VERTICAL FRICTION-SAW.

1,028,103.

Specification of Letters Patent. Patented June 4, 1912.

Application filed August 20, 1910. Serial No. 578,186.

*To all whom it may concern:*

Be it known that I, HENRY A. FERGUSSON, a citizen of the United States, residing at St. Louis, Missouri, have invented a certain new and useful Improvement in Vertical Friction-Saws, of which the following is a full, clear, and exact description, such as will enable others skilled in the art to which it appertains to make and use the same, reference being had to the accompanying drawings, forming part of this specification, in which—

Figure 1 is a side elevational view of my improved vertical friction saw; Fig. 2 is a rear elevation of the same, and Fig. 3 is a top, plan view.

This invention relates to a new and useful improvement in friction saws designed for cutting commercially rolled structural beams and angles, and consists in mounting the disk directly upon the shaft of a motor arranged to move on vertical guideways, said motor and saw being controlled by lifting means whereby they are raised above the work to be operated upon and permitted to drop by gravity. The lifting means shown is a fluid actuated piston, though it is obvious that other means may be employed to raise the saw to its elevated position. The work is arranged upon a work-support in such a way that the center of the saw will cause the entering cutting edge to effect a shearing cut or a cut at an angle to the axis of the beam or angle arranged in position whereby the saw not only operates in a diagonal line through the beam and in this way is able to effect a uniform travel through the beam because in only part of its travel is there presented more than one thickness of web and flange, but, in addition, the downward and outward pressure of the cutting disk forces the beam firmly in position against the work-support so that it is not necessary to provide said work-support with clamping means.

My invention is exceedingly simple and effective in operation. In practice, the disk is designed to run at about two thousand (2,000) revolutions per minute, and operates upon the well-known principle incident to the use of friction cutting disks. Where the fluid actuated piston is used, either hydraulic or air pressure may be employed to raise the piston and its connected motor-driven disk above the work to be operated upon, the fluid being controlled by a two-way valve whereby, as the sustaining pressure is gradually released, the saw is permitted to drop by gravity and effect its cut. In heavy work, a three-way valve may be employed whereby pressure may be admitted above the piston if desired. I prefer, however that the saw disk be yieldingly suspended and dropped by gravity, as in this way it is practically self-controlled by cutting its own way through the material. The vertical face of the work-holder is adjustable on its supporting bed, so that the beam or angle can be arranged at an angle to cut the same on an incline.

In the drawings, 1 indicates a base-plate from one end of which rises a housing 2. The inner edge of this housing constitutes a vertical guideway 3, on which is arranged a frame 4. To this frame is connected a yoke 5, which is, in effect, an extension from a piston cross-head 6, said cross-head being secured to a piston rod 7 whose head 8 operates in a cylinder 9.

10 is a pipe leading into the lower end of the cylinder, said pipe being controlled by a two-way valve 11 whereby pressure is admitted to and exhausted from the under side of the head 8.

On the frame 4 is arranged a motor 12, on whose armature shaft 13 is secured a friction cutting disk 14. This cutting disk is preferably arranged to one side of the vertical guideways, as shown in Fig. 2.

15 indicates a pair of pedestals,—or a single pedestal with a slot for the passage of the cutting disk may be employed,—on which is bolted a knee bracket 16 constituting the vertical face of the work support. This bracket is mounted upon the pedestal 15 by means of bolts 17, the mounting being such that one of the bolts acts as a pivot, and the other coöperates with a curved slot in the pedestal 15 (shown in dotted lines in Fig. 3) whereby the bracket may be adjusted in angular positions to enable the disk to cut the beam or angle on a bevel.

In operation, pressure is admitted under the piston head 8 so as to raise the cutting disk and its driving motor. The beam or other article to be cut is now placed in position, the brackets 16 having been previously properly adjusted. The two-way valve is manipulated to release the pressure from under the cutting disk, and as the cutting disk strikes the beam it will first cut into one of the upper flanges, its continued downward movement cutting the opposite upper flange and the web, this diagonal cut being the easiest for the cutting disk, and the resultant of the pressures exerted upon the beam being such as to hold the beam firmly in position without requiring the use of clamping devices for the work.

The machine illustrated in the drawings is designed to cut commercially rolled structures up to as large as 24-inch I-beams, "Bethlehem sections", and other large and unwieldy shapes. My invention has the advantage, also, of being able to sever, on account of the diagonal cut, built-up structures, such as columns, girders, and the like. If heavy work is encountered, weights can be added to the frame 4, or, as before mentioned, pressure admitted above the piston head 8 through a pipe 18 leading to a three-way valve placed in the position of the two-way valve shown.

In Fig. 1, I have shown a bracket 19 secured to the under side of the base-plate on which a railroad rail can be placed, as indicated by dotted lines. In this manner the device can be used on a truck in railroad construction and the rails severed without requiring them to be lifted above the base-plate.

What I claim is:

A device of the class described comprising a base plate, a pair of vertical guideways disposed adjacently on said base plate, said guideways being provided with outwardly disposed flat bearing faces, a fluid motor disposed on said base plate between said guideways, a carriage secured on said vertical guideways for vertical movement on said bearing faces, a yoke operating between said guideways connecting said carriage to an actuated member of said fluid motor, a motor and cutting disk mounted on the carriage, and an adjustable work support mounted on said base plate in such a position as to be intersected by the forward edge of the cutter.

In testimony whereof I hereunto affix my signature in the presence of two witnesses, this 11th day of August, 1910.

HENRY A. FERGUSSON.

Witnesses:
M. P. SMITH,
B. L. CROWLEY.